June 23, 1936.   F. W. JACKMAN   2,045,084
METHOD AND MEANS FOR PRODUCING COMPOSITE PICTURES
Filed Dec. 26, 1931   5 Sheets-Sheet 1
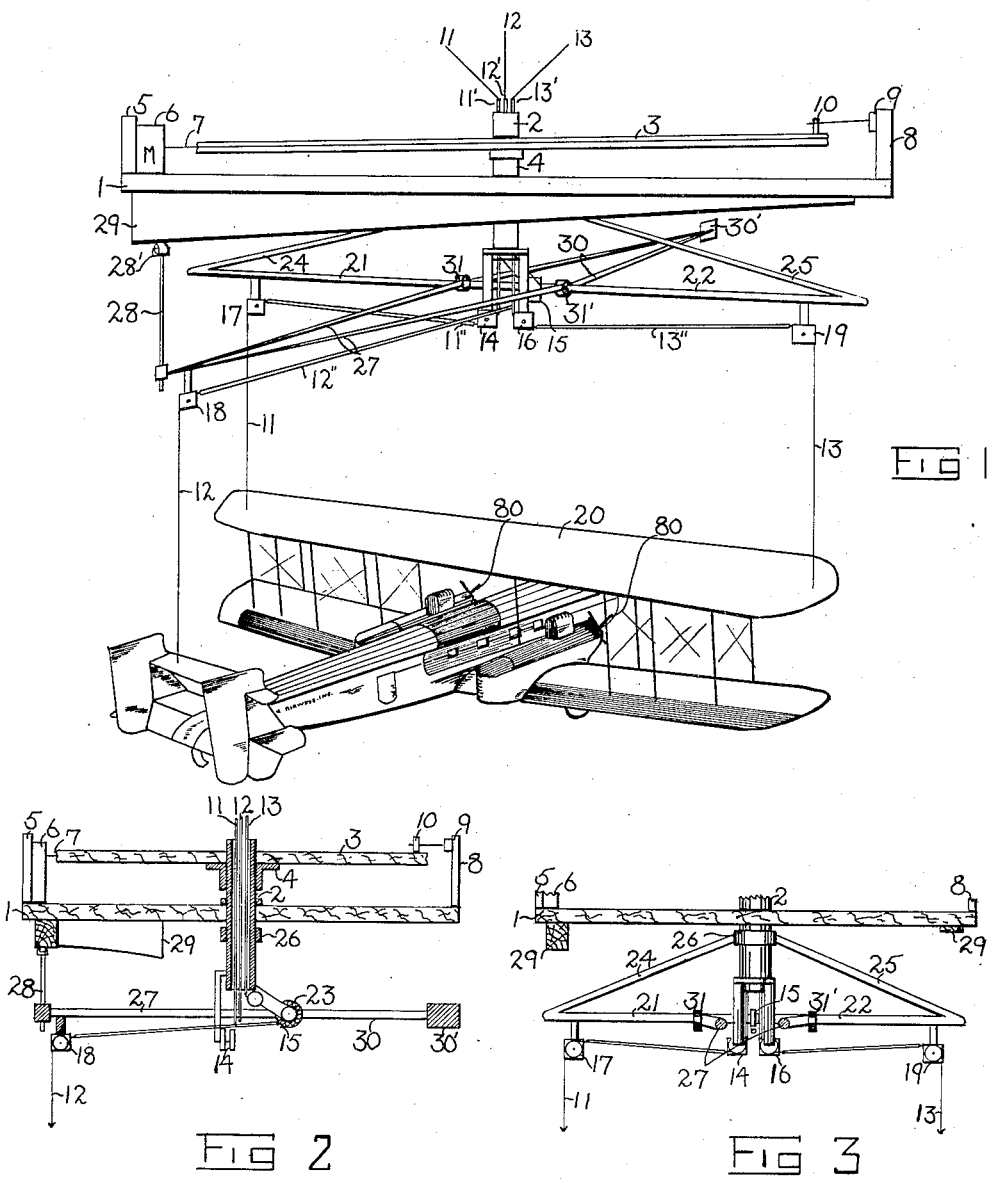
INVENTOR:
FRED. W. JACKMAN
BY
W E Beatty
ATTORNEY.

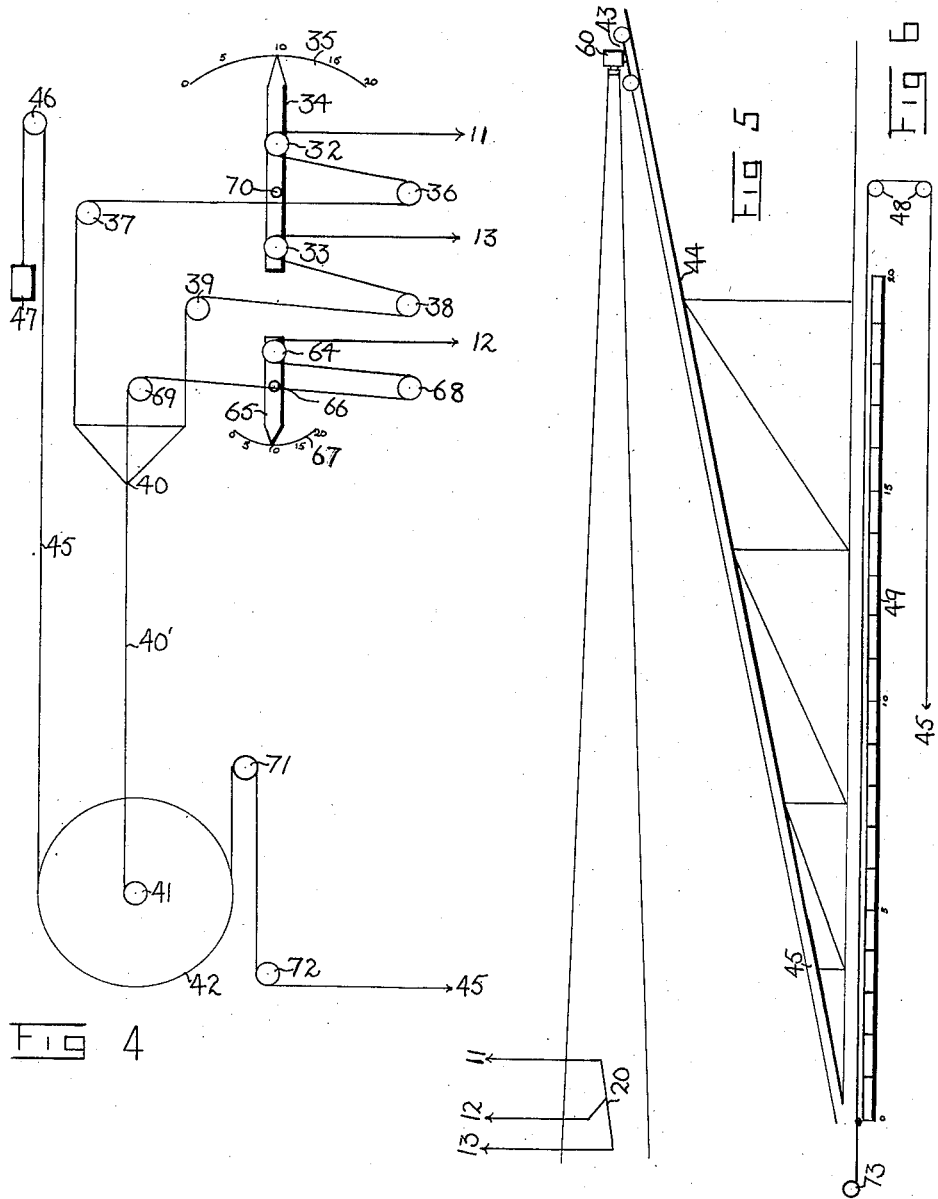

June 23, 1936.　　　　F. W. JACKMAN　　　　2,045,084

METHOD AND MEANS FOR PRODUCING COMPOSITE PICTURES

Filed Dec. 26, 1931　　　5 Sheets-Sheet 3

INVENTOR:
FRED. W. JACKMAN

ATTORNEYS.

June 23, 1936.　　　F. W. JACKMAN　　　2,045,084
METHOD AND MEANS FOR PRODUCING COMPOSITE PICTURES
Filed Dec. 26, 1931　　　5 Sheets-Sheet 4
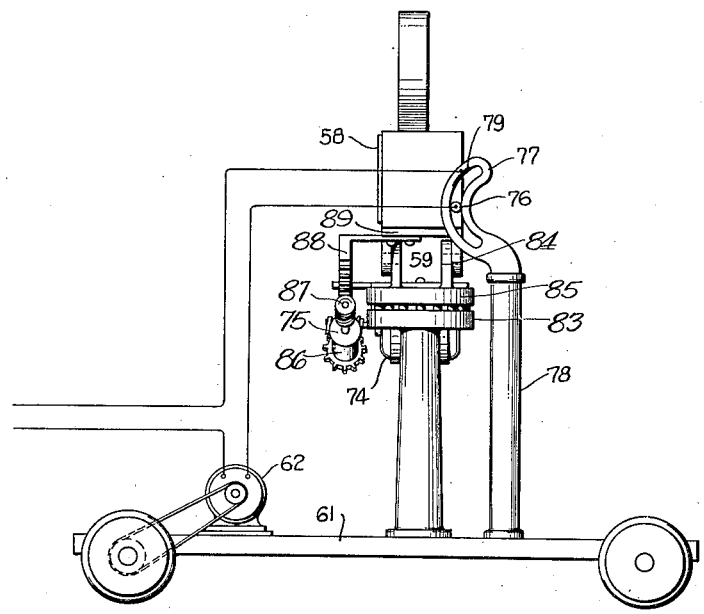
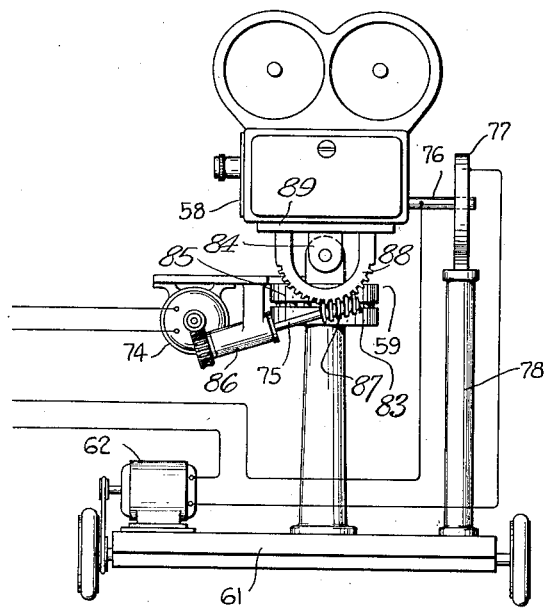
INVENTOR
Fred W. Jackman
BY W. E. Beatty
ATTORNEY June 23, 1936.   F. W. JACKMAN   2,045,084
METHOD AND MEANS FOR PRODUCING COMPOSITE PICTURES
Filed Dec. 26, 1931   5 Sheets-Sheet 5
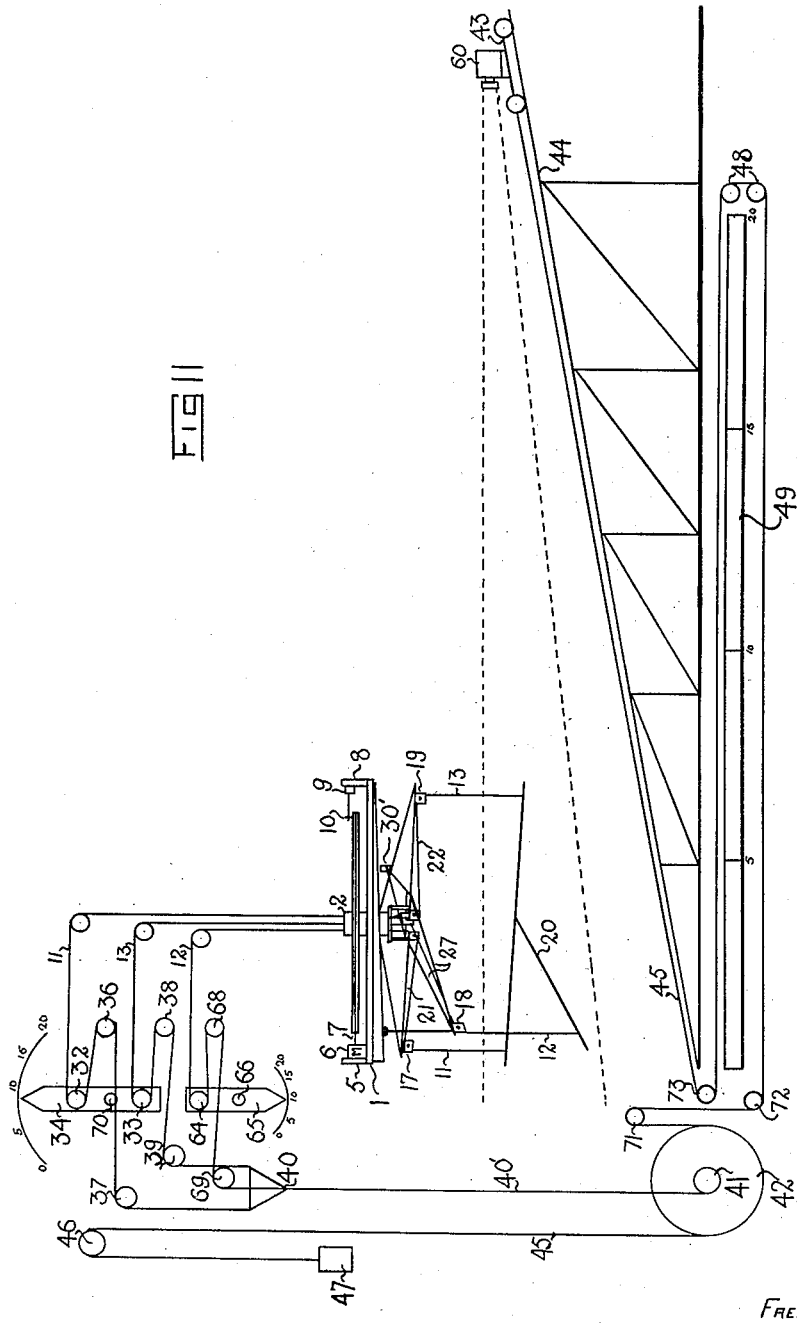
INVENTOR:
Fred W. Jackman.
BY W A Beatty
ATTORNEY.

Patented June 23, 1936

2,045,084

UNITED STATES PATENT OFFICE 2,045,084

METHOD AND MEANS FOR PRODUCING COMPOSITE PICTURES

Fred W. Jackman, Beverly Hills, Calif., assignor to Warner Bros. Pictures, Inc., New York, N. Y., a corporation of Delaware Application December 26, 1931, Serial No. 583,286

17 Claims. (Cl. 88—16)

This invention pertains to the art of photography, and has to do with the production of composite motion pictures, by establishing a means and method of correlating the photographing of a foreground or action component with the photographing of a background component, whereby these components appear in the final composite picture in harmony and correct relationship to each other.

A composite picture is a picture wherein the components comprising the composite whole are derived from different and independent sources. In other words, the background component may have been photographed on a day and at a place far distant from the place where it is proposed to photograph the foreground. In order to accomplish this, the two components must be so arranged that the secondary photographing will harmonize with the primary photographing, so that in the final film they will coincide and form one composite whole.

This invention relates, therefore, to the making of composite motion pictures, and more particularly, to the making of composite motion pictures wherein one component is to be the picture of a moving object, such as an airplane or other aircraft.

An object of the invention is to move and maneuver an object such as a miniature airplane, so that said movings and maneuverings will simulate to an exact degree those of a full scale object, such as an airplane, in actual flight. The invention also provides means and method for so positioning a miniature airplane in flight that said position at any given second during said flight will correlate and harmoniously correspond with and in relation to a previously exposed background scene.

Another object of the invention is to insure that the miniature airplane, or the like, will always remain in the proper position in the field of view of a camera during the maneuverings referred to above. This is accomplished by providing a connection between the airplane, or the like, and the camera, whereby their relative positions are in fixed relation.

Another object of the invention is to move a camera in a positive manner, whereby the field of view of the camera will traverse a predetermined path in which the moving object, such as a miniature airplane, is to appear. This is accomplished by mounting a camera on a universal bearing, guiding means cooperating therewith however for insuring that the camera will be directed along a prescribed path.

Another object of the invention is to support a miniature airplane, so that it may be rotated while being photographed, and so that the tail of the aircraft can also be moved vertically to simulate actual flight conditions. This is accomplished by providing a plurality of rotatable suspension members for the aircraft, together with means for varying the vertical position of the suspension member for the tail of the airplane during its rotation.

In the case where the miniature aircraft is supported by wires, an arrangement is provided whereby these wires serve as the electrical circuit connection from a suitable source of current to certain electrical devices associated with said aircraft, such as a light in the pilot's cabin and a small motor for driving the propeller.

For further details of the invention, reference may be made to the drawings, wherein Fig. 1 is a perspective view of the apparatus, with a miniature airplane suspended in position.

Fig. 2 is a cross-section through the center and at right angles to the wings of the airplane.

Fig. 3 is a cross-section showing the construction of the wing supports, and also showing the pulley blocks uncovered.

Fig. 4 shows a means for controlling the position of the wings and tail of the miniature airplane, so that any desired position of those elements may be obtained by means of levers provided for this purpose. This figure also shows a means and method of gearing, whereby the camera and the airplane are synchronously connected so that said airplane is always in the field of view of said camera.

Fig. 5 diagrammatically shows the correct position of the airplane in relation to the field of view of the camera at any given second during the photographing of the scene.

Fig. 6 is an illustration of a method which enables the director to know in what position said motion picture camera and said miniature airplane should be at any given second, in order that they may be in harmony with the previously exposed (or to be exposed) background scene.

Figure 7:
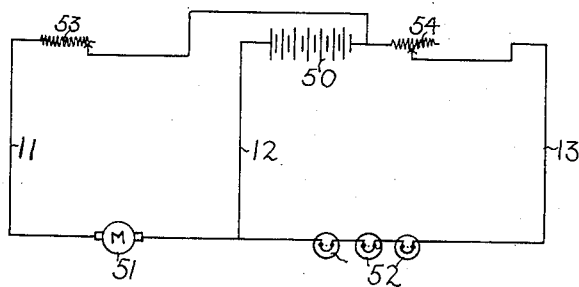

Fig. 7 is an illustration of an electric circuit that can be used to operate the motors and the lights of said miniature airplane.

Figure 8:
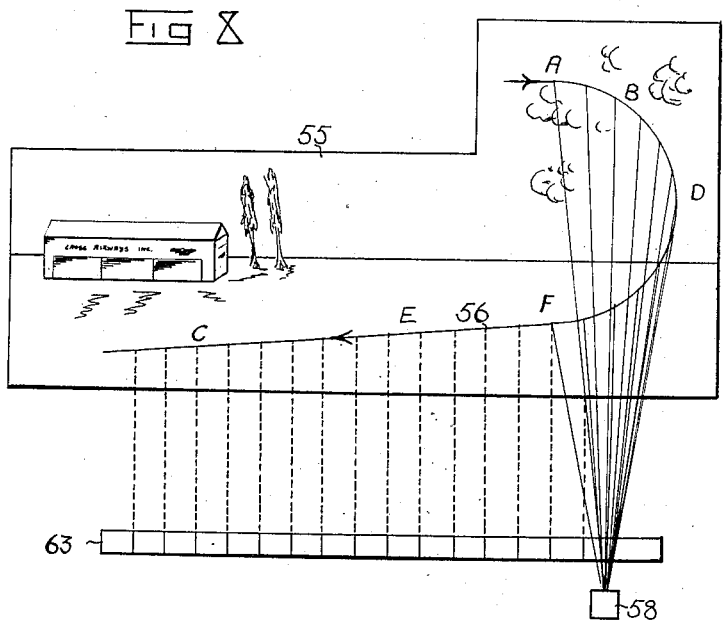

Fig. 8 shows a background scene painted onto a screen, and there is drawn on it the proposed path to be taken by said airplane.

Figs. 9 and 10 are side elevations of a camera mounted on an electric dolly and having a means for directing the field of view of the camera so that said airplane takes a predetermined path in the field of view.

Fig. 11 is a schematic view of the parts shown in Figs. 1, 4, 5 and 6.

While the invention will be specifically described in connection with making a composite picture of a miniature airplane and a background appropriate thereto, it will be apparent that the invention, as claimed in its various aspects, may be used in other relations.

Referring in general to the drawings, the method of making a composite picture with an airplane in the foreground consists in determining the length of the fall of the airplane, the distance from which said airplane is coming towards the camera, the angle through which said airplane turns and the length of time to be taken for the "shot". From this information, there are four scales marked out in seconds as in Figs. 4, 6 and 8. The turntable in Fig. 1 is also calibrated in seconds. The airplane is suspended from its platform in Fig. 1, and the dolly is placed on a ramp in Fig. 5 bearing a correct ratio of the fall of the airplane to the distance to be traveled. The camera is started, and the apparatus begins to move. The turntable in Fig. 1 rotates through the desired angle, causing also the tail support to lower as described. The director reads off the seconds as the pointer moves along the indicator scale; as he calls each second, the tail and wing handles are moved into their previously marked positions until the end of the scene is reached.

To take the background scene, a canvas or other material is painted to represent clouds and a landing field comprising the background of a composite picture and across which background the airplane is to move in a curved path, A, B, D, F, E, C as in Fig. 8. The path of the airplane is plotted from this curve and a cam is made which serves to guide an electrically driven arm that is attached to the camera and alters the field of view of said camera to follow the curve, or angle, of rotation of the airplane, until it reaches a certain predetermined point where forward motion of the airplane begins. At this point, a switch closes a circuit and causes a dolly supporting said camera to move along in front of said background scene, keeping in correlation with the path of the airplane by means of the predetermined scale of seconds. The two films so obtained are printed together and the final negative, of an airplane in flight making a landing, is obtained.

Referring more particularly to the drawings:
The apparatus for supporting the miniature airplane consists of a circular wooden base 1 suitably suspended from the rafters of a stage by ropes, wooden braces, or the like. Through the center of base 1 passes a hollow shaft 2 to which is attached a circular wooden turntable 3 by a collar 4. An upright 5 is mounted at the edge of said base 1 to which is attached a motor 6, having a suitable reduction gear, for driving the turntable 3 at a suitable speed by means of a belt 7, or other suitable driving means. Another upright 8 is mounted diametrically opposite said upright 5 to which is attached a knife switch 9, which is actuated by a knock pin 10 located on the upper surface of said turntable 3. The switch 9 is a limit switch in the circuit of motor 6, serving to open the circuit of the motor, and thereby stop it when the turntable 3 has been turned into such a position that the pin 10 operates this knife switch 9, as will be well understood. Three tubes of flexible insulation, known as "electric flex" 11', 12' and 13' guide the wires 11, 12 and 13 through said hollow center shaft 2, where said wires pass over insulated pulleys 14, 15 and 16, and still guided by similar tubes of insulation 11", 12" and 13" pass over insulated pulleys 17, 18 and 19, and so to the wings and tail of a miniature airplane 20, as indicated.

Pulleys 17 and 19, which carry the wing wires, are supported, respectively, by the horizontally extending arms 21 and 22, respectively, whereas the pulley 18, which carries wire 12, is fastened to arm 27, this arm being rotatably supported on arms 21 and 22 by means of ball-bearings 31 and 31', respectively. The arm 21 is of metal and welded to the metallic member 24 fastened at its upper end to collar 26 fixed to the hollow shaft 2. Arm 22 is similarly supported through arm 25 by collar 26. Referring to the ball-bearings 31 and 31', the races therefor are supported by the ends of the forked supporting arm 27 and permit rotation of the arm 27 about the arms 21 and 22 as an axis. The forks of arm 27 constitute the stationary shafts, respectively, of these ball-bearings.

Upon the tail support 27 is mounted an upright 28 bearing at its upper end a free running wheel 28', said wheel running along a wooden cam 29 mounted on the under surface of base 1. The cam 29 is inclined at an angle to give the proper tilt to the tail of the airplane in relation to its rotation. When the roller 28' is about diametrically opposite the position shown in Fig. 1, and commencing to be depressed by the cam 29, the tail of airplane 20 is up, representing flight conditions; whereas, when the roller 28' has been fully depressed by cam 29, as shown in Fig. 1, the airplane is horizontal, representing landing conditions. It will be apparent that the cam 29 gradually shifts the airplane from flight condition to landing condition.

In order to keep the wheel 28' in firm frictional contact with the wooden cam 29, counterbalancing arms 30 corresponding to arms 27, and having counterweight 30', are provided. The arms 30 are suitably fastened to the pulley races of the bearings 31 and 31', similar to the attachment of arms 27 thereto.

In Fig. 4 the wing wires 11 and 13 pass over insulated pulleys 32 and 33, which are mounted equidistant from the pivot point of a handle or pointer 34, said handle having a scale 35 made to suit the particular picture being "shot", and conveniently located for the operator to control his wing wires 11 and 13, each of said wires then passing over two stationary pulleys 36 and 37 and 38 and 39, respectively, to a common point 40 where they are tied to wire 40', first being suitably insulated. The same arrangement is used for the tail wire 12, which passes over pulley 64 mounted on the upper end of pointer 65, which is pivoted at 66 and provided with a cooperating scale 67 calibrated in terms of the height of the tail of the airplane. Wire 12, on leaving pulley 64, passes over stationary pulley 68 to stationary pulley 69, and then to the common point 40, where all three wires are tied, as above described.

The pointer 34 is provided with a pivot point 70, about which it rotates. The wire 40' is led over a winding drum 41 situated in the center of a larger stationary pulley 42, the ratio of the circumference of these pulleys being the same as the ratio of the fall of said airplane 20 to the distance traveled by the dolly 43 along the ramp 44. A wire 45 passes over two stationary pulleys 71 and 72, and under said pulley 42, whence said wire passes over another stationary pulley 46 and is fastened to a suitable counterbalance 47. Said wire 45 passes over a suitable set of pulleys 48 (Fig. 6) and along the side of a scale 49 which is marked to show the seconds of travel of the dolly 43 for the taking of a particular picture.

Wire 45 passes over stationary pulley 73 and then to a dolly 43, where it is fastened. The camera, supported by the dolly is, therefore, mechanically tied to the miniature airplane so that both of them move in timed relation to each other. It will be readily understood that the weight of the dolly 43 and the camera 60, mounted thereon, is such that when released, it travels by gravity down the inclined track 44. Wire 45 moves to the left in Fig. 4, dropping counter-balance 47 and unwinding wire 40', which moves upward, dropping the wings and the tail of the airplane. While dolly 43 is riding down the inclined track 44, the handles 34 and 65 are manipulated so that at the beginning of the photographic operation the tilt of the wings and the position of the tail correspond to the position that an airplane would actually have at the beginning of its flight, as illustrated at "A" in Fig. 8, the arrowheads indicating the direction of movement of the airplane along path 56. In general, it may be said that the scales 35, 67 and 49 are chosen to tilt and move the airplane in any desired fashion.

In the case illustrated, in Fig. 8, it is assumed that the airplane at point "A" is flying level from left to right, and that the airplane is to follow the curve 56, reverse its direction, and make a landing at point "C". Furthermore, the camera is to make a running "shot"; that is, gradually approach the airplane as it proceeds from "A" to "C". This is provided for in the apparatus which has been described, for the reason that the camera 60 gradually approaches the airplane 20 while the camera 60 is riding down the ramp 44. At the same time, the handles 34 and 65 are manipulated as follows: at point "A" on curve 56 these two handles are in the positions shown in Fig. 4, whereby the airplane is leveled. As the airplane progresses towards point "B" in Fig. 8, handle 34 is moved to the left to drop the right wing of the airplane, while the correct relation between the tail and the wings is maintained through the cam 29, acting on the tail support. At point "D" the handle 34 would be substantially at zero. As the airplane proceeds from "D" to "E", the handle 34 is moved gradually to the right until it is about in the position shown in Fig. 4, and then the handle 65 comes into play, being moved to the left to drop the tail sharply for a three point landing.

Fig. 8 illustrates a painted background scene, the path 56 of which, where the airplane is to appear, is photographed with the camera arrangement shown in Figs. 9 and 10, to produce a background photograph which is to be combined with the photograph of the airplane in Fig. 1 (as photographed with the camera arrangement in Fig. 5), to produce the desired composite picture. These two motion picture photographs, of the background and foreground, i. e., airplane, may be combined either by double printing or by the so-called "Jackman" process wherein a positive film of the background photograph of Fig. 8 would be dye-toned a selected color, such as yellow, this dye-toned positive film or key being placed in front of the final negative in the focal plane of a motion picture camera such as camera 60, to photograph the airplane 20 while maneuvered as above described, and while illuminated with yellow light, the same color as the color of the positive key, the airplane, while thus illuminated, being photographed before a plain background reflecting blue light, i. e., light of a color complementary to that of the yellow color referred to above. This process is well understood in the art.

It will also be understood that the airplane 20 and the painted background scene in Fig. 8 are in miniature and in proper scale to each other, and that the final composite motion picture produced, however, is enlarged to proper size. It will also be understood, as is customary with miniature "shots", that the photographing is done with high speed motion picture cameras and that the final enlarged film is projected at a standard reduced speed.

In connection with Figs. 8, 9 and 10, it will now be described how the background is photographed, and how the background is co-ordinated with the foreground. The arrangement herein shown not only provides for photographing that part of the painted background in Fig. 8, represented by curve 56, but the adjustment of the camera 60 with relation to airplane 20 is such that, in the final composite picture, the airplane moves across the aperture of the camera in a path corresponding to 56. That is to say, the picture frame of the airplane at point "A", in the final composite picture, will show the airplane in the upper left-hand corner of the field of view; at point "B", the airplane approaches the center of the field of view, and finally, at point "C", the airplane is in the lower left-hand corner of the picture frame. This is accomplished by dropping the airplane 20 faster than camera 60 drops, while the cameraman on dolly 43 pans camera 60 to laterally shift the airplane in the field of view of camera 60.

The scale 63 in Fig. 8 is calibrated in seconds and used as a guide to co-ordinate the speed of travel of camera 58 with the tilting and turning of airplane 20 according to scales 35 and 67.

In order to move the camera so as to photograph that part of the background in Fig. 8, shown by curve 56, the arrangement in Figs. 9 and 10 is provided. Referring to these figures, the camera 58 is supported by a pivotal base 59 on the dolly 61. The pivoted base 59 may comprise a ball bearing mounting 83 for rotation of the camera 58 about a vertical axis and a horizontal bearing mounting 84 to allow for movement of the camera about a horizontal axis. The dolly is driven by motor 62 and the camera is "panned" in a curved path by motor 74, which is coupled to the spindle 75, as is well understood in the art. The camera 58 carries an arm 76 which rides in a stationary cam 77 fastened to dolly 61 by support 78. Thus it will be seen that when the camera 58 is moved about the horizontal axis of the bearing mounting 84 the arm 76 will follow the cam surfaces 77 to also rotate the camera about the vertical axis of the bearing mounting 83. The arm 76 may be slightly smaller in diameter than the width of the cam slot 77 to prevent wedging thereof as the camera 58 is moved about a vertical axis. It will be apparent to those skilled in the art, however, that instead of providing the cam 77 on the dolly 61, and movable therewith, this cam surface may be of the desired shape and mounted, stationary, parallel to the dolly track, so that the dolly in its movement causes the arm 76 to ride over or under the cam and move the camera in a desired fashion. Preferably, the circuit for motor 62 is closed through a contact rail 79, running along the surface of cam 77, and through a contact on the end of the arm 76, whereby, after the camera has been moved in a curved path to photograph the portion of curve 56 from "A" to "F" (the dolly being stationary during this operation), the circuit of motor 62 will then be closed to drive the dolly parallel to scale 63 to photograph that part of the background from "F" to "C", the tilt motor 74 continuing to operate at this time so as to cause pin 76 and the upper portion of cam 77 to tilt camera 58 down, whereby the field of view of the camera extends along the sloping line from "F" to "C", which corresponds to the path that the airplane takes in landing. In the operation of photographing the background, the camera 58 is first tilted about the bearing mounting 84 until the arm 76 rests in the bottom of the cam slot 77, thereby aligning the optical axis of the camera with the point "A" at the upper end of the path 56. The camera mechanism is started and the motor 74, which is suitably secured to the revolving portion 85 of the bearing mounting 83 is then started so as to transmit power through the spindle 75 which is journaled in a bearing 86, also secured to the upper revolving portion 85 of the bearing mounting 83. A worm 87 at the end of spindle 75 meshes with a segmental gear 88 provided on the under surface of a camera supporting plate 89 to move the camera about a horizontal axis. As the camera 58 moves about the bearings 84, the arm 76 follows the arcuate cam 77 thus causing any point along the optical axis of the camera to describe an arcuate path corresponding to the path 56 (Fig. 8). When the camera has been so moved that it is directed at the point F at the lower end of the arcuate path A, D, F, the arm 76 will engage the rail 79 to operate motor 62 thus moving the dolly 61 along a path parallel to the background 55. Since the camera 58 is still being tilted about its horizontal axis while the camera dolly is moving, the optical axis of the camera will be directed along the path F, C.

Fig. 7 shows an electrical circuit in which the wires 11, 12 and 13 are in circuit with a battery 50, or other source of electrical power to control the motor 51, which drives the propellers 80, and to illuminate the lights 52 in the cabin, through variable resistances 53 and 54. The battery 50 and rheostats 53 and 54, may be located on the floor of the stage, out of sight of the camera. Preferably, the rheostats 53 and 54 are manipulated so that the speed of the propeller is reduced and the lights in the cabin are made brighter as the airplane lands.

I claim:

1. Photographic apparatus comprising a miniature aircraft, a camera for photographing said aircraft, suspension means for said aircraft connected to said camera and comprising speed changing means whereby said camera is adapted to travel a greater distance than said aircraft in a given length of time, and an inclined track for said track, the angle of inclination of said track being so related to said speed changing means that said aircraft remains in the correct position of the field of view of said camera while said camera is moving on said inclined track.

2. Photographic apparatus comprising a miniature aircraft, a camera for photographing said aircraft, suspension means for said aircraft connected to said camera and comprising speed changing means whereby said camera is adapted to travel a greater distance than said aircraft in a given length of time, and an inclined track for said camera, the angle of inclination of said track being so related to said speed changing means that said aircraft remains in the field of view of said camera while said camera is moving on said inclined track, and means for turning said aircraft while it is being photographed.

3. Photographic apparatus comprising a miniature aircraft, a camera for photographing said aircraft, suspension means for said aircraft connected to said camera and comprising speed changing means whereby said camera is adapted to travel a greater distance than said aircraft in a given length of time, an inclined track for said camera, the angle of inclination of said track being so related to said speed changing means that said aircraft remains in the field of view of said camera while said camera is moving on said inclined track, and means for tilting said aircraft with respect to said camera.

4. Photographic apparatus comprising a miniature aircraft, a camera for photographing said aircraft, suspension means for said aircraft connected to said camera and comprising speed changing means whereby said camera is adapted to travel a greater distance than said aircraft in a given length of time, an inclined track for said camera, the angle of inclination of said track being so related to said speed changing means that said aircraft remains in the field of view of said camera while said camera is moving on said inclined track, means for turning said aircraft in substantially a horizontal plane, and means for tilting said aircraft while photographing.

5. A camera, a bearing for supporting said camera for movement about vertical and horizontal axes respectively, means comprising an upright curved guide, and a guide pin cooperating therewith associated with said camera, for tilting said camera in a curved path.

6. A base, a turntable mounted on said base, a motor for driving said turntable, a plurality of arms connected to said turntable for rotation therewith, a plurality of said arms being adapted to support the wings of a miniature airplane and another of said arms being adapted to support the tail of said airplane, and means for varying the vertical position of said last named supporting arm relative to the vertical position of said other arms during the rotation thereof.

7. The method of making a composite photograph of an aircraft and a background scene appropriate thereto, which comprises preparing a motion picture film of successive portions of a path in said background scene where the aircraft is to appear, and simultaneously light impressing at a motion picture speed an unexposed film with the images of the successive frames of said background film and with images of an aircraft in said path in mutually exclusive areas, while maneuvering said aircraft in a predetermined path before said unexposed film to change the angular appearance of the image of said aircraft in said path to simulate actual flight conditions of said aircraft before said background scene, the path of said aircraft being such that said aircraft occupies successive positions corresponding to the successive positions of the path in said background scene.

8. The method of making a composite motion picture of a background scene and a foreground scene comprising a vehicle, which comprises preparing a motion picture of successive portions of a path in said background scene where the vehicle is to appear, light impressing at a motion picture speed an unexposed film with the images of successive frames of said background motion picture, while arranging before said unexposed film said vehicle to intercept the background scene along said path where said vehicle appears in the composite picture, whereby the photographic images of said vehicle and said background scene appear in areas which are substantially mutually exclusive, and in moving said vehicle in a predetermined path in correlation with the changing path in the background scene, while thus light impressing said unexposed film.

9. The method of making a composite motion picture of a foreground object moving along a predetermined path in a background scene, which comprises preparing a motion picture of successive portions of the path in said background scene along which the object is to appear, light impressing at a motion picture speed an unexposed film with the images of successive frames of said background motion picture, while arranging said foreground object before said unexposed film to intercept the background scene along said path, whereby the photographic images of said foreground object and said background scene appear in areas which are substantially mutually exclusive, and in moving said foreground object in a predetermined path in correlation with the changing path in the background scene while thus light impressing said unexposed film.

10. Photographic apparatus comprising an inclined track adapted to support a camera dolly, means for supporting a miniature aircraft for movement in a vertical line, and means coordinating the movement of said camera dolly on said track with the vertical movement of said aircraft.

11. In a system for moving and photographing a miniature of an object having several degrees of freedom, means for supporting said miniature at a plurality of points, means for uniformly varying the vertical position of said supporting means a predetermined amount, means for varying the relative vertical positions of said points of support in a predetermined manner to simulate the movements of a full sized object, a movable camera, and means automatically coordinating the movement of said miniature with the movement of said camera.

12. A system for simulating an aircraft in flight, comprising the combination of a miniature of said aircraft, a plurality of flexible suspension members attached to the tips of the wings and to the tail of said aircraft, means associated with the members supporting the wings for varying the bank of said wings, means associated with said tail supporting member for varying the tilt position of said tail, and means common to all of said suspension members for uniformly varying the vertical height at which said miniature is suspended.

13. The combination of a base, a vertical shaft rotatably mounted therein, a pair of suspension members extending horizontally in opposite directions from said shaft and rotatable thereby, a third suspension member angularly disposed with respect to a line through said pair of suspension members and rotatable by said shaft, cables for said suspension members for suspending an object below said shaft, means common to all of said cables for varying the effective length thereof, and means individual to each of said cables for further varying the effective length thereof during operation of said common means.

14. The combination of a base, a vertical shaft rotatably mounted therein, a pair of suspension members extending horizontally in opposite directions from said shaft and rotatable thereby, a third suspension member angularly disposed with respect to a line through said pair of suspension members and rotatable by said shaft, cables for said suspension members for suspending an object below said shaft, means common to all of said cables for varying the effective length thereof, means individual to each of said cables for further varying the effective length thereof during operation of said common means, a movable camera, and a camera cable therefor associated with said common means for keeping the object suspended by said cables in the field of view of the camera during the movement of the camera and during the operation of said common and individual means.

15. The combination of a base, a vertical shaft rotatably mounted therein, a pair of suspension members extending horizontally in opposite directions from said shaft and rotatable thereby, a third suspension member angularly disposed with respect to a line through said pair of suspension members and rotatable by said shaft, cables for said suspension members for suspending an object below said shaft, and means comprising a cam concentric with said shaft for varying the effective length of one of said suspension members upon rotation of said shaft.

16. The method of making a composite photograph representing a running shot of a full-sized aircraft and a background scene appropriate thereto, which comprises preparing a motion picture film of successive portions of a path in the background scene where the aircraft is to appear, and simultaneously light impressing at a motion picture speed an unexposed film with the images of the successive frames of said background film and with images, gradually varying in size, of a miniature aircraft in mutually exclusive areas, while maneuvering said miniature aircraft before said unexposed film to change the angular appearance of the image of said miniature aircraft to simulate actual flight conditions and while maneuvering said miniature aircraft so that it occupies successive positions corresponding to the successive portions of said path in said background scene.

17. The method according to claim 16 wherein said path has portions leading in different directions at different altitudes.

FRED W. JACKMAN.